(12) United States Patent
Beski et al.

(10) Patent No.: US 7,121,897 B2
(45) Date of Patent: Oct. 17, 2006

(54) RADIAL TRAVEL LIMITER FOR LIGHTER SOCKET LANCES

(75) Inventors: Richard Alex Beski, Branford, CT (US); Susan Marie Verellen, Novi, MI (US); Thomas D. Belanger, Jr., Saline, MI (US)

(73) Assignees: Casco Products Corporation, Shelton, CT (US); Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/070,465

(22) Filed: Mar. 2, 2005

(65) Prior Publication Data

US 2006/0199436 A1   Sep. 7, 2006

(51) Int. Cl.
*H01R 24/04* (2006.01)
(52) U.S. Cl. .................................. 439/668; 219/267
(58) Field of Classification Search ................ 439/668, 439/669, 265, 640, 638, 639; 219/267, 265
See application file for complete search history.

(56) References Cited

U.S. PATENT DOCUMENTS

| 2,180,711 A | 11/1939 | Lehmann |
| 2,210,025 A | 8/1940 | Cohen |
| 2,730,605 A | 1/1956 | Johnson |
| 3,185,954 A * | 5/1965 | Schade, Sr. .................. 439/332 |
| 3,955,333 A | 5/1976 | Fellin |
| 4,544,226 A * | 10/1985 | Lupoli et al. ................ 439/551 |
| 4,622,454 A | 11/1986 | Castille |
| 5,493,098 A | 2/1996 | Diederich |
| 7,033,225 B1 | 4/2006 | Belanger, Jr. |
| 2005/0153602 A1 | 7/2005 | Belanger ..................... 439/668 |
| 2006/0148324 A1 * | 7/2006 | Nam ........................... 439/668 |

* cited by examiner

*Primary Examiner*—Tulsidas C. Patel
*Assistant Examiner*—Phuongchi Nguyen
(74) *Attorney, Agent, or Firm*—Mitchell D. Bittman; Louis C. Dujmich

(57) ABSTRACT

A cigar lighter including a mounting ring, and a socket insertable into the mounting ring. The socket has at least one cantilevered lance extending in a longitudinal direction of the socket and directed radially inwardly. The mounting ring has a cylindrical body with an inner surface. A rib is provided on the inner surface of the housing so as to extend in a longitudinal direction. The rib is arranged in a vicinity of the lance of the socket so as to limit outward radial travel of the lance.

13 Claims, 4 Drawing Sheets

RADIAL TRAVEL LIMITER FOR LIGHTER SOCKET LANCES

BACKGROUND OF THE INVENTION

The present invention relates to a cigarette or cigar lighter for an automobile, and more particularly to a radial travel limiter for socket lances for such lighters.

Various lighters for automotive applications are known, including the lighter shown in the following U.S. Pat. Nos. 4,622,454; 3,955,333; 2,210,025; 2,730,605; 2,180,711; 6,740,850; and 5,493,098.

As taught in U.S. Pat. No. 5,493,098, and as shown in attached FIG. 1 (which comes from the patent), typically cigarette lighters for automobiles comprise a receptacle 10 that includes a socket member or shell 12 that receives the lighter plug. The shell 12 has spring fingers 34 that frictionally engage the lighter plug. The lighter also has a plastic mounting ring 24. During assembly of the automobile, typically, the mounting ring 24 is inserted first. The mounting ring typically has projections which prevent it from being removed without tools once it is inserted into an opening, for example, in the dashboard of the automobile.

As previously mentioned, the lighter socket or shell 12 typically has spring fingers or lances 34 stamped into the metal socket body. The spring fingers are conventionally stamped out of the metal of the socket and are directed slightly radially inwardly. The spring fingers assist in keeping the lighter plug in position, and in particular, exert a frictional force against the lighter plug to keep it in position, specifically when the lighter plug is being energized by electrical current. The spring fingers 34 also provide an electrical path to ground. Once the heating coil of the lighter has been heated sufficiently to cause ignition, a thermally sensitive bimetallic disk or clip converts from a first position to a second position and pops the lighter plug outwardly to a position whereby it is disengaged from the electrical current and ready for use. The spring fingers 34 exert a frictional force to maintain the lighter plug in position and only when the bimetallic disk or clip inverts or changes its position does the lighter plug pop to the slightly outward position in the socket, as it is well known, with the fingers holding the lighter plug in position of the socket.

Sometimes, electrical plugs are inserted into the lighter socket for supplying electrical current to other electrical devices such as a computer, a radio, a television or other automotive accessories such as tire inflators, vacuums, etc. The specifications for the exact sizes of these electrical plugs for these electrical accessories and devices are often not very exact and many times the plugs are poorly made and do not conform to the manufacturer's or the cigarette lighter's size specifications. As a result, particularly when plugs are slightly larger than they should be, the lances or spring fingers are forced radially outwardly and deformed. As a result, the frictional force exerted against the cigarette lighter plug is insufficient to maintain the plug properly in position and/or to allow electrical current to complete a circuit to ground for the lighter plug. This is due to the lances having become deformed and no longer pressing radially inwardly to an extent sufficient to provide electrical contact.

SUMMARY OF THE INVENTION

Accordingly, the present invention alleviates this problem by providing radial travel limiters for the spring fingers which prevent the spring fingers from being deformed too far radially outwardly. This is accomplished in the present invention by providing the mounting ring for the lighter socket with members that limit the radial travel of the spring fingers or lances when the lighter socket is inserted into the mounting ring.

In one embodiment of the invention, the plastic mounting ring has a longitudinally extending rib or ribs on an inner surface of the mounting ring. In a preferred embodiment, the ribs are molded in the mounting ring in a position such that they are disposed radially outwardly adjacent to the position of the spring fingers of the lighter socket when the lighter socket is inserted into the mounting ring. The lighter socket and the mounting ring are typically constructed so that the lighter socket only fits into the mounting ring in one orientation. Accordingly, the ribs are disposed longitudinally adjacent the position of the lances in the socket. The arrangement of the ribs prevents the lances from being moved radially outwardly beyond a prescribed distance because the ribs project radially inwardly toward the lances. Accordingly, when an oversized electrical plug for an electrical accessory is inserted into the lighter socket, the radially outward movement of the lances is limited by the ribs.

The mounting ring has an axial length that is relatively standard in the prior art. In one embodiment, the axial ribs extend along the entire axial length of the mounting ring.

In another embodiment of the invention, the ribs are longer than the axial length of the mounting ring. The ribs begin at a front end of the mounting ring and extend past the back end of the mounting ring. In still another embodiment, the entire axial length of the mounting ring is increased to match the length of the ribs. The last two embodiments allow the mounting ring to accommodate lighter sockets of different types which have the lances or spring fingers disposed in different longitudinal positions. In this way, the specific longitudinal position of the lances is not a factor because the ribs are long enough to prevent excessive travel of the lances no matter where their position in longitudinally on the lighter socket.

Other features and advantages of the present invention will become apparent from the following description of the invention which refers to the accompanying drawings.

DETAILED DESCRIPTION OF EMBODIMENTS OF THE INVENTION

Figure 1:
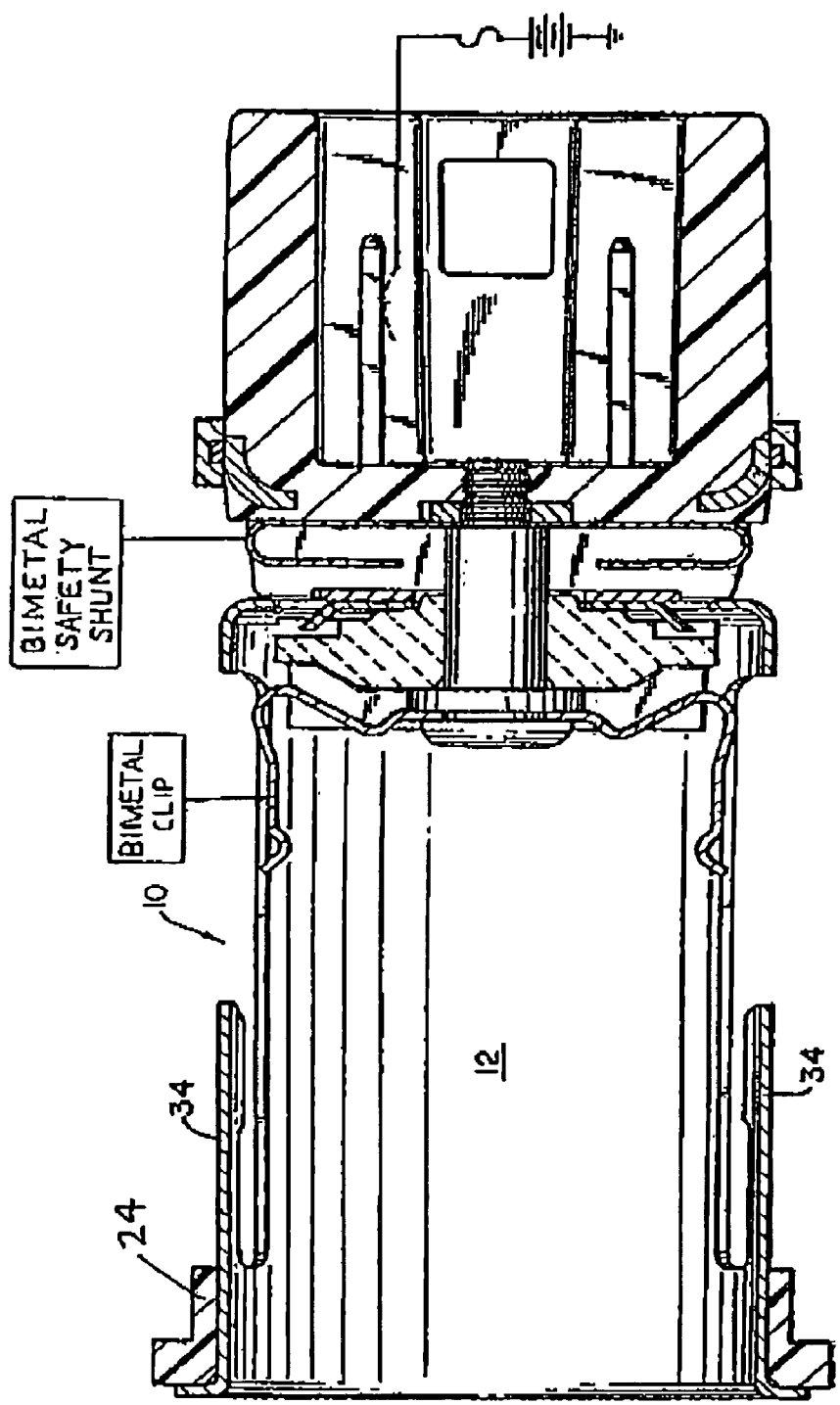
FIG. 1 is a cut away view of a prior art lighter assembly including the lighter heating unit assembly and the lighter socket.

As previously discussed, FIG. 1 illustrates a conventional lighter assembly from U.S. Pat. No. 5,493,098. The present invention improves on this type of construction.

Figure 2:
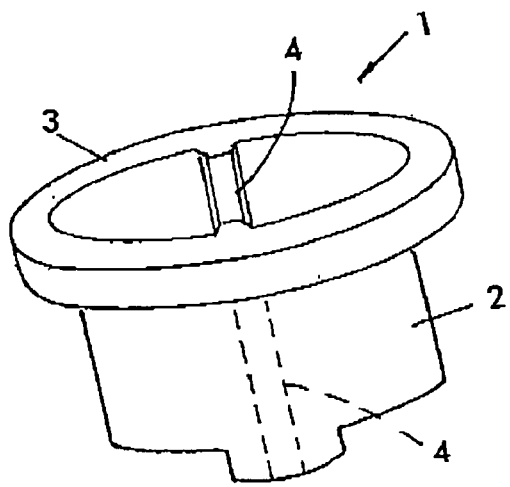
FIG. 2 is a perspective view of a mounting ring pursuant to the present invention.
Figure 5:
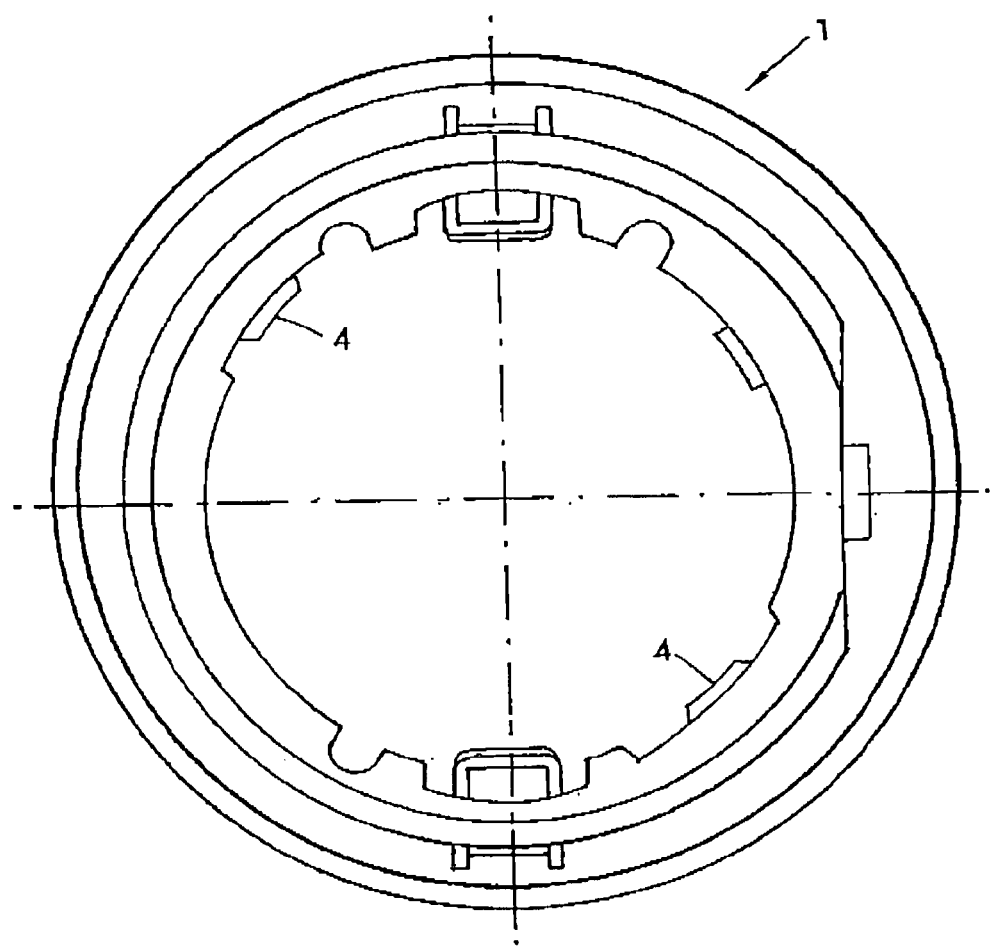
FIG. 5 is a view along arrow A in FIG. 2.

FIG. 2 shows a mounting ring 1 (comparable to element 24 in FIG. 1). The mounting ring 1 is generally made of plastic and has a cylindrical body 2 that extends axially from an outer end 3 of the mounting ring 1. A pair of ribs 4 are molded on the inner wall of the body 2 so as to project inwardly as shown in FIG. 5. The ribs 4 extend radially from the surface of the inner wall of the mounting ring 1 to an extent sufficient to prevent the spring fingers or lances 34 of the socket (see FIG. 1) from extending radially outwardly in the direction of the mounting ring to a degree where the lances would deform and no longer provide electrical contact for the lighter or an electrical plug that is inserted into the lighter socket.

Figure 4:
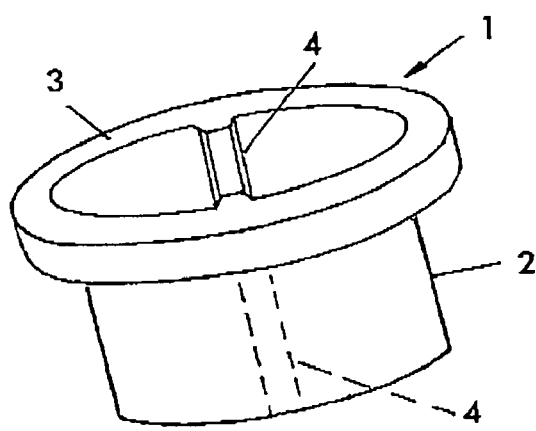
FIG. 4 is a view as in FIG. 2 of yet another embodiment of the invention.

In the embodiment shown in FIG. 4, the ribs 4 extend along an entire conventional longitudinal length of the mounting ring body 2. It is also conceivable for the ribs 4 to extend over only a portion of the longitudinal length of the body 2 of the mounting ring 1.

FIG. 2 shows an embodiment in which the ribs 4 extend beyond the rear end of the body 2 of the mounting ring 1.

Figure 3:
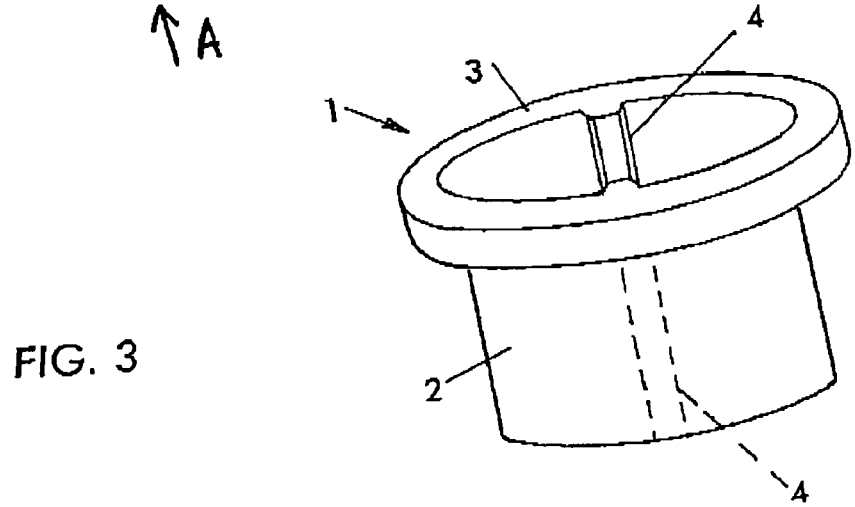
FIG. 3 is a view as in FIG. 2 of another embodiment of the invention.

The embodiment of FIG. 3 differs from the embodiment of FIG. 2 in that in this embodiment the body 2 of the mounting ring 1 is also of an extended length.

The ribs 4 are disposed longitudinally in the mounting ring adjacent to positions of the lances or spring fingers of the socket when the socket is mounted in the mounting ring. For example, in the illustrated embodiments the ribs 4 are separated by 180°. The mounting ring as shown in FIGS. 2 and 3 can accommodate a wider variety of lighter sockets since even if the lances are arranged at different longitudinal positions on the socket, they would still engage the ribs.

The mounting ring and the ribs are preferably a unitary plastic piece so as to facilitate simple, inexpensive construction. However, other materials can also be used.

Figure 6:
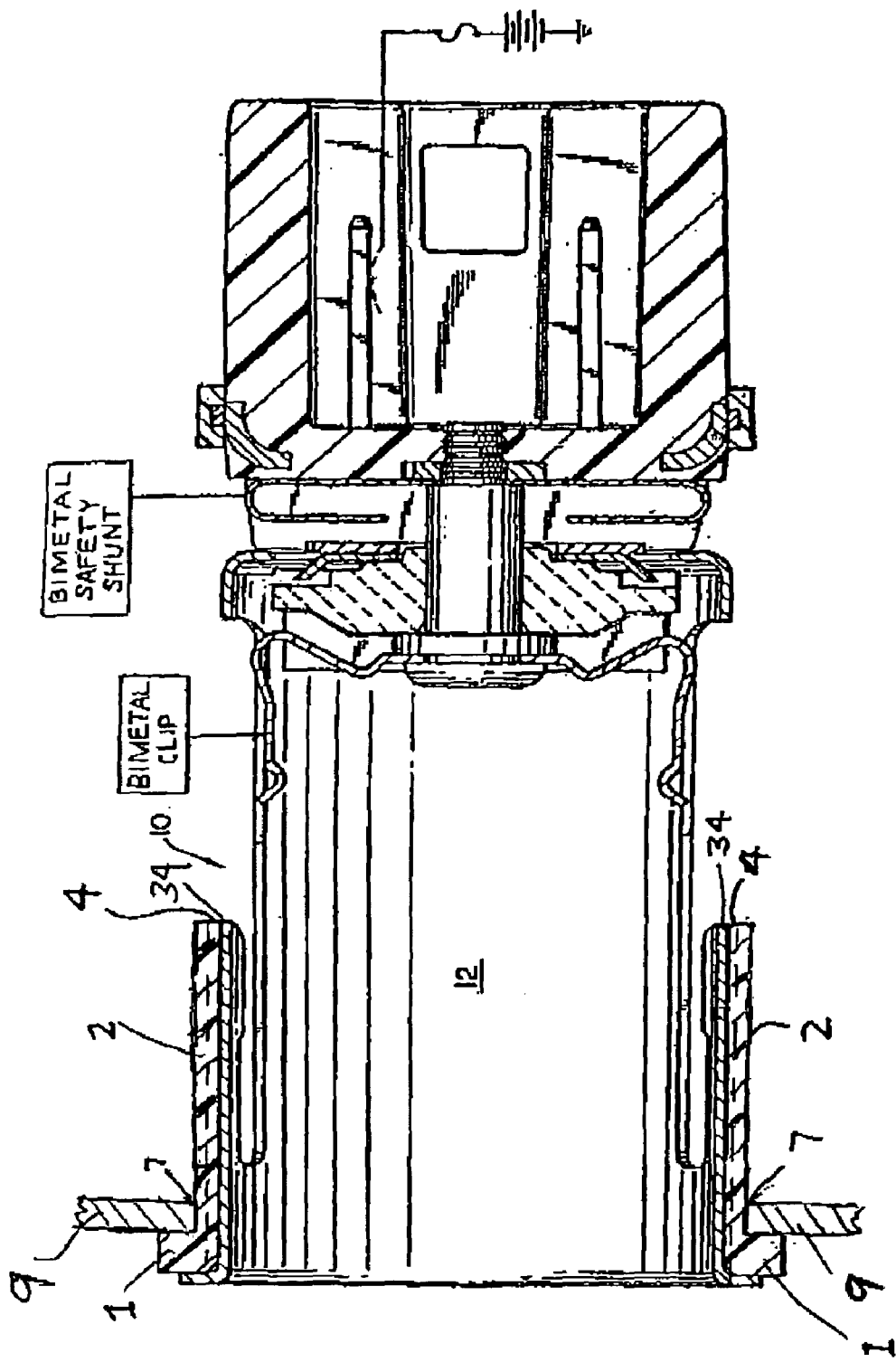
FIG. 6 is a cut away view of a lighter embodying the invention.

FIG. 6 shows a lighter receptacle like that of FIG. 1 having a mounting ring 1 according to the invention mounted in a mounting opening 7 of wall 9 of a vehicle and showing the ribs 4 that limit outward radial travel of the lances 34.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cigar lighter receptacle comprising:
   a mounting ring insertable through a mounting opening for receiving the lighter receptacle; and
   a socket insertable into the mounting ring,
   the socket having at least one cantilevered lance extending in a longitudinal direction of the socket, and directed radially inwardly,
   the mounting ring having a cylindrical body with an inner surface, a rib being provided on the inner surface of the body so as to extend in a longitudinal direction,
   the socket being slidably insertable into the mounting ring, whereby the rib is arranged in alignment with the lance of the socket so as to limit outward radial travel of the lance.

2. A cigar lighter receptacle according to claim 1, wherein the rib extends along an entire length of the body of the mounting ring.

3. A cigar lighter receptacle according to claim 1, wherein the rib extends beyond a rear end of the mounting ring body in the longitudinal direction.

4. A cigar lighter receptacle according to claim 1, wherein the mounting ring and the rib are made of plastic.

5. A cigar lighter receptacle according to claim 1, wherein two ribs are provided on the inner surface of the mounting ring body.

6. A cigar lighter receptacle according to claim 5, wherein the ribs are arranged 180° from one another.

7. A cigar lighter receptacle according to claim 5, wherein the ribs and the mounting ring body are of equal length.

8. A mounting ring for a cigar lighter receptacle having a socket with at least one spring lance extending in a longitudinal direction of the socket and directed radially inwardly, the socket being slidably insertable into the mounting ring and the mounting ring being insertable through a mounting opening for receiving the lighter receptacle, the mounting ring comprising:
   a cylindrical body having an internal surface; and
   at least one rib extending along the internal surface of the body and projecting radially inwardly,
   the socket being slidably insertable into the mounting ring whereby the rib is arranged to be in alignment with the lance so as to limit outward radial travel of the lance.

9. A mounting ring according to claim 8, wherein the body and the rib are of equal length.

10. A mounting ring according to claim 8, wherein the body has a first axial length and the rib has a second axial length, the second axial length being longer than the first axial length.

11. A mounting ring according to claim 8, wherein a flange is provided at a first end of the body.

12. A mounting ring according to claim 8, wherein two ribs are provided on the internal surface of the body, the ribs being arranged 180° from each other.

13. A mounting ring according to claim 12, wherein the body and the ribs are made of plastic.

* * * * *